T. J. SHEA.
DRIVING MECHANISM.
APPLICATION FILED AUG. 24, 1910.
1,009,188.
Patented Nov. 21, 1911.
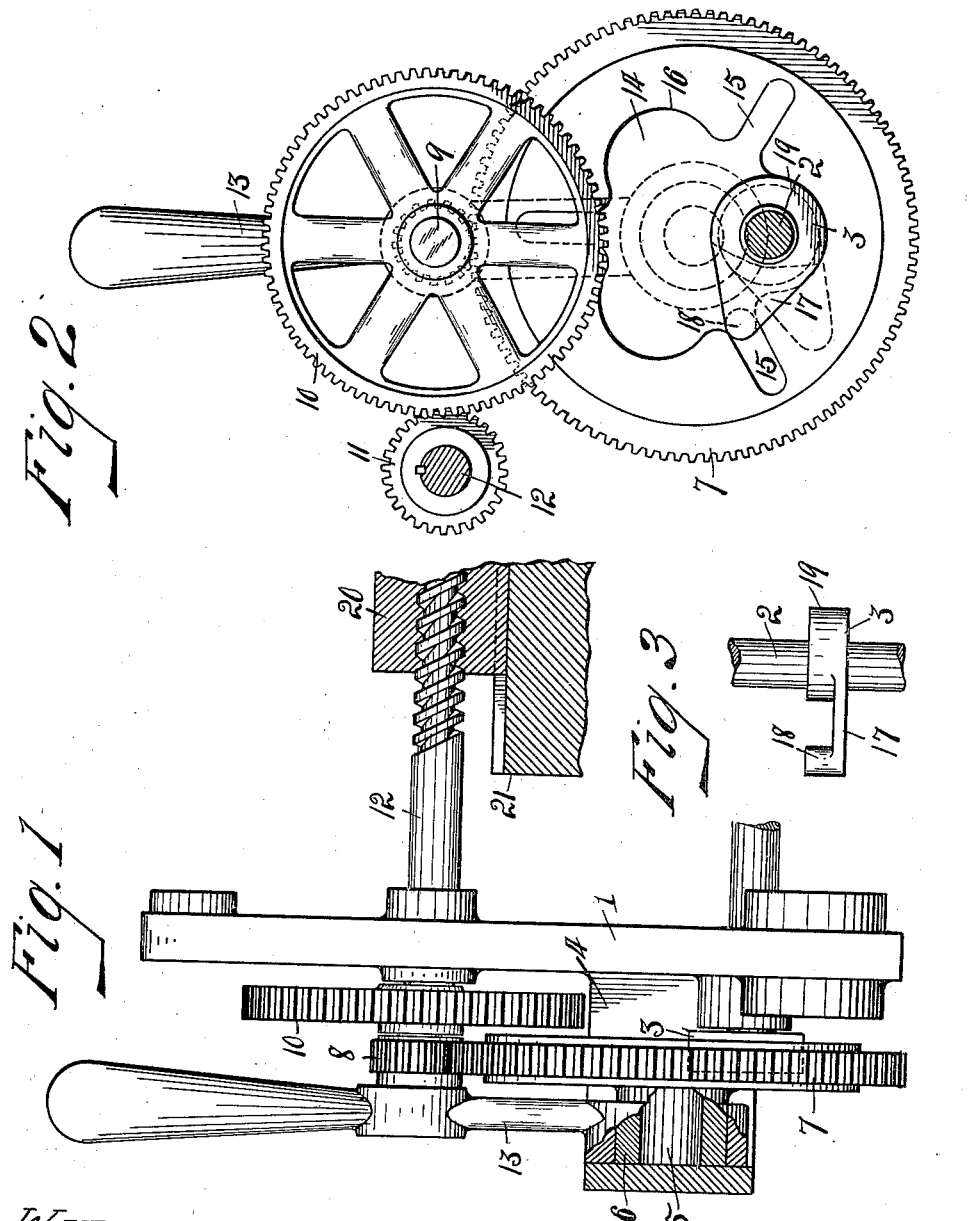
WITNESSES.
C. E. Walker.
E. E. Thomas.
INVENTOR
Thomas J. Shea.
By Owen & Owen.
His attys.

UNITED STATES PATENT OFFICE.

THOMAS J. SHEA, OF PORTLAND, OREGON.

DRIVING MECHANISM.

1,009,188.     Specification of Letters Patent.      Patented Nov. 21, 1911.

Application filed August 24, 1910. Serial No. 578,663.

*To all whom it may concern:*

Be it known that I, THOMAS J. SHEA, a citizen of the United States, and a resident of Portland, in the county of Multnomah and State of Oregon, have invented a certain new and useful Driving Mechanism; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to means intended more particularly for use on punch, drill or other presses in which a part, such, for instance, as a tool holder, is equidistantly moved at regularly timed intervals to advance a tool or tools to successively act on a piece of work, but is not restricted to such use as it can be used in any connection for which it may be adapted or appropriate.

The object of my invention is the provision of an improved and simple mechanism of this class, which is positive and efficient in its operation, and capable of easy and rapid adjustment to change the spacing or length of each successive movement of the machine part actuated thereby, and which is applicable for use in most machines of the class described in which the tools and work are relatively and automatically movable to permit the tools to successively act at different points on the work.

The invention is fully described in the following specification and while in its broader aspect it is capable of embodiment in numerous forms, a preferred embodiment thereof is illustrated in the accompanying drawings, in which,—

Figure 1 is a side elevation of my apparatus with portions broken away. Fig. 2 is an inner side view of such mechanism with the bearing parts removed, and Fig. 3 is an edge view of the drive member of such mechanism.

Referring to the drawings, 1 designates the portion of the frame of a machine with which the invention may be associated and 2 is a drive shaft which is journaled in said frame part and carries a wiper-member 3 at its outer end. Secured to or projecting from the outer side of the standard 1 is a yoke 4 having a stud 5 projecting inwardly therefrom toward said standard and carrying the outwardly extended hub portion 6 of a gear 7. This gear meshes with a small pinion 8, which is mounted on a shaft 9 with a larger gear 10. The gear 10 in turn meshes with a gear 11, carried by the adjacent end of a worm shaft 12, which is journaled at such end in the standard 1. The shaft 9 is carried by an arm 13 for revoluble movements about the axis of the gear 7, due to said arm being loosely mounted on the hub 6 of such gear, thus adapting the gear 10 to be revolubly adjusted relative to the axis of the gears 7 to mesh with gears 11 of different diameters, as the speed at which it may be desired to drive the worm shaft 2 may require.

The gear 7 is of disk form and has its inner side, or that which is adjacent to the standard 1, centrally recessed, as at 14, for the wiper member 3 to work in. The recess 14 is provided, in the present instance, with the three equidistantly spaced radial grooves or races 15, and intermediate these races the wall of such recess is outwardly curved, as at 16, in arcs which are eccentric to the axis of the gear 7. The shaft 2 carrying the wiper member 3 is disposed at one side of the axis of the gear 7 and the wiper member is adapted to work within the recess 14 of such gear. In order to cause the gear 7 to be intermittently rotated upon a continuous rotation of the wiper member 3, such member is provided at one side of its axis with an arm 17, which carries a laterally projecting stud 18 for working in the races 15 of the gear 7. The side 19 of the member 3 opposed to that from which the arm 17 projects describes an arc of a circle which is concentric to its axis and is laterally broadened to adapt it to work within the curved portions 16 of the recess 14 when in register therewith, said curves 16 being struck from a circle which is concentric to the axis of the gear 7 and intersects the axis of the shaft 2. It is thus apparent that when the side 19 of the member 3 is working within a registering recess 16 the gear 7 is locked against rotary movements, and that when the stud 18 is working within a race 15 the gear 7 is caused to have a partial rotation upon its axis due to the coaction of said stud with the walls of said races and the moving of the curved side 19 of the member 3 from locking coaction with the curved portions 16 of the recess wall.

The worm 12 is shown as threading through a movable part 20 which may comprise a table or other part of a machine having intermittent movements, and is guided for such movements longitudinally of the worm by any suitable guiding means 21.

In the operation of my invention, a continuous running of the drive shaft 2 causes the wiper-member 3 to have a regular revoluble movement upon its axis. Upon each revolution of the member 3 its stud 18 works into a registering race 15 of the gear 7, and if such races are three in number, as shown, the member 3 is so proportioned as to impart one-third of a rotation to the gear 7 before the stud 18 passes from the engaged race 15. As the stud 18 leaves a race, the circular surface 19 at the opposite end of the wiper member 3 works in to a registering recess 16 on the gear 7, continuing in contact with the curved wall thereof until the stud 18 is again moved into position to coact with a wall of the succeeding race 15 to again impart a partial rotation to the gear 7. The working of the curved portion 19 of the wiper-member within a registering recess 16 of the gear 7 positively locks such gear against further rotation until the wiper-member surface 24 is moved from coacting engagement therewith. It is thus apparent that if the gear 7 is provided with three races and the member 3 is accordingly proportioned, the gear 7 will have a complete rotation at every third revolution of the member 3. The intermittent rotary movement which is imparted to the gear 7 from the wiper-member 3 at each revolution thereof communicates a predetermined rotation through the gear 8, shaft 9 and gears 10 and 11 to the worm-shaft 12, whereby the machine part 20 is advanced a predetermined distance at each revolution of the member 3.

It is evident that while in the present instance, only three races 15 and intermediate curved surfaces 16 are provided in a gear 7, the number of such races and surfaces may be changed as the number of desired intermittent movements of the gear to complete a rotation thereof may require, the proportion of the wiper member 8 being changed accordingly.

I wish it understood that my invention is not limited to any specific construction or arrangement of the parts except in so far as such limitations are specified in the claims.

Having thus described my invention, what I claim as new and desire to secure by Letters Patent, is,—

1. In combination, a revoluble member and a rotary driven member, said revoluble and driven members being located one within the other and having parts which coöperate during a portion of each revolution of the drive member to impart a partial rotation to the driven member and parts which coact during the remaining portion of a revolution of the drive member to lock the driven member against rotation.

2. In combination, a rotary driven member having a central recess provided with radiating races, and a drive member having a part adapted to work in one of said races at each revolution of said drive member to impart a predetermined rotary movement to the driven member and having a part for coacting with portions of the wall of said recess to coöperate therewith to lock the driven member against rotation during a portion of each revolution of the drive member.

3. In combination, a driven member having a plurality of radial races on one side thereof connected by outwardly curved walls, a drive member having a stud adapted to work in such races to impart a predetermined rotation to the driven member during a portion of a revolution of the drive member and having a part adapted to coöperate with the curved walls intermediate such races to lock the driven member against movements during the remainder of the revolution of the drive member.

4. In combination, a drive member having a stud projecting laterally from one side of its axis and being provided on the opposite side of its axis with a curved surface concentric to its axis, a driven member having a centrally located recess in a side thereof having radiating races in which the stud of the drive member successively works to impart a predetermined rotation to the driven member upon each revolution of the drive member and having surfaces coöperating with the curved surfaces of the drive member to lock the driven member against rotation when the stud is not in coaction with a race therein.

5. In combination, a drive member having a stud projecting from a side thereof and having a curved surface on the opposite side of its axis to said stud and concentric to such axis, a driven member having its axis offset from the axis of the drive member and centrally provided in one side thereof with a recess with the walls of which the stud and curved surfaces of the drive member alternately coact in a revolution of the drive member to first impart a predetermined rotation to the driven member and then to lock it against rotation.

6. In combination, a driven member having a recess in a side thereof, the walls of which are irregularly curved to form a plurality of races and curved surfaces, and a revoluble drive member having driving and locking parts which alternately coöperate with the walls of such recess to rotate and then lock the driven member against rotation during a single continuous revolution of the drive member.

7. In combination, a driven member having a centrally located recess alternately provided with races 15 and curves 16, a revoluble drive member having its axis disposed at the side of the axis of the driven member and having parts which alternately coact with the races and curves of such member to intermittently rotate and lock the driven member against rotation.

In testimony whereof, I have hereunto signed my name to this specification in the presence of two subscribing witnesses.

THOMAS J. SHEA.

Witnesses:
C. W. OWEN,
M. G. GASKELL.

Copies of this patent may be obtained for five cents each, by addressing the "Commissioner of Patents, Washington, D. C."